April 30, 1929. A. P. THURSBY 1,710,847
DISPLAY FIXTURE
Filed July 24, 1925
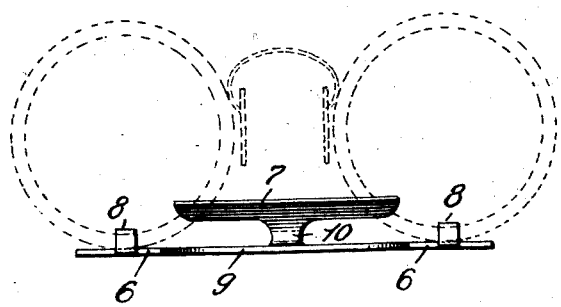
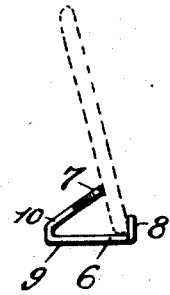
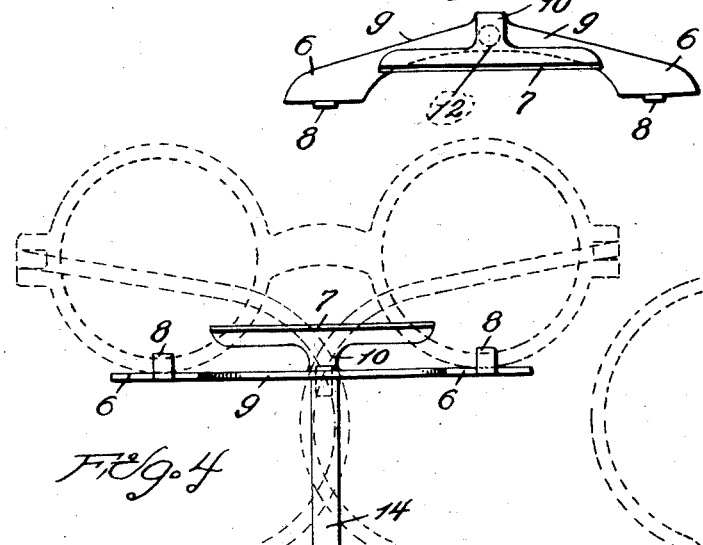
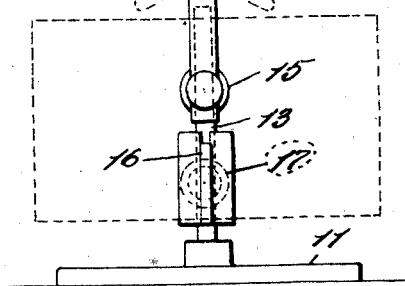
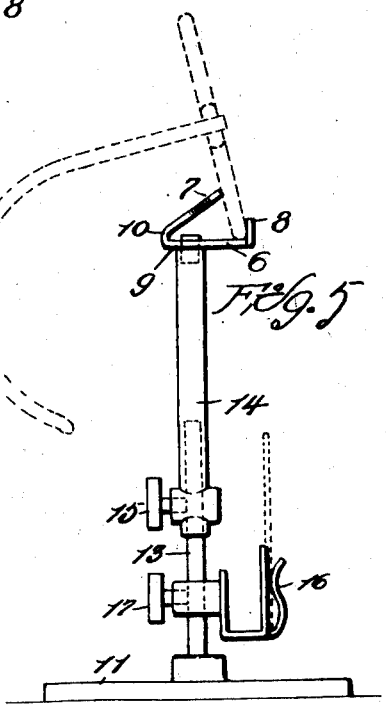
INVENTOR
ARTHUR P. THURSBY,
by Eiler & Schaumburg, Attorneys.

Patented Apr. 30, 1929.

1,710,847

UNITED STATES PATENT OFFICE.

ARTHUR P. THURSBY, OF ST. LOUIS, MISSOURI.

DISPLAY FIXTURE.

Application filed July 24, 1925. Serial No. 45,820.

My invention relates to improvements in display fixtures and is particularly adapted to support and hold spectacles, or eye glasses, in positions best suited for their display in windows, show cases and such other places where spectacles, of either the "nose", "temple", or "lorgnette" types, may be exhibited, or demonstrated, for show or sale purposes.

Numerous forms of devices for this purpose have been resorted to, such as card mountings, over the faces of which spectacles are suspended or supported by integral elements of the mounting; extraneous fastening elements, such as metal hooks or clamps, supported by the card mounting; mountings, in the form of stands, having blocks over which the "bridges" of the spectacles are hung or clamped; other devices, in the form of easels, upon which the spectacles are supported; and more commonly a piece of velvet or plush upon which the spectacles are simply laid, or rested, with their lenses flat upon the velvet.

A common objection to all such forms of display fixtures for this purpose is that by reason of their dimensions and characters the spectacles, or articles for display, are optically insignificant; another objection is that the devices are not adapted to "hold" all types of glasses, and hence a variety of devices are required; a still further objection is that both skill and time are required in the proper placing of glasses upon those mountings.

The object of my invention is to provide a device, of simple and economical construction, for the display of spectacles, with their lenses in a substantially vertical position, which affords maximum facility in the positioning of the spectacles thereon, and minimum ocular distraction from the spectacles, and which may be readily applied to a stand or other fixture for the display of a card or like article with the spectacles.

My invention consists in the novel construction, arrangement and combination of parts as hereinafter fully, clearly and concisely described, definitely pointed out in my claims and illustrated by the accompanying drawing, in which:—

Fig. 1 is a front elevation of a spectacle display fixture, constructed in accordance with my invention, showing by dotted lines a pair of "nose" glasses as held thereon; Fig. 2 is an end elevation of the device showing "nose" glasses thereon; Fig. 3 is a plan view of the device; Fig. 4 is a front elevation of the device, as supported on an elevating stand, showing by dotted lines a pair of "temple" glasses and a card as held by the stand; and Fig. 5 is an end elevation of the device and stand as shown in Fig. 4.

Primarily my device consists of a table, a fulcrum 7, and a stop 8, and by preference the device is formed as an integral unit and comprises the recited article (spectacle) supporting tables or areas 6, at the forward margin of each of which is a stop 8, a distance piece 9, connecting the tables 6, and a forwardly and upwardly inclined neck 10, leading from the rear margin of the distance piece 9, at its approximate longitudinal center, and carrying the fulcrum 7 at its free end.

The tables 6, are provided as points of support for spectacles, and as such may be, of relatively small dimensions. I prefer, however, to give to the tables, such length dimensions as will provide supporting points for spectacles of differing distances between lens centers, similarly the fulcrum 7, is provided as a leaning point for spectacles, and as such may be, of relatively small dimensions, but to which I prefer to give such a length dimension as will provide a leaning point to accommodate spectacles of various sizes and styles, and similarly the stops 8 may be minute obstructions in the path of the spectacles moving about the fulcrum 7, but to which I prefer to give such length dimensions as will accommodate spectacles of differently spaced lens centers.

As shown in Figs. 1 and 2, the mounting, or placing of the spectacles consists, only, of a resting of the rims of the lenses upon the tables 6, with the lenses placed, vertically between the fulcrum 7 and stops 8, so that the table will support the spectacles, the fulcrum hold the spectacles, with their lenses substantially vertical and the stops prevent movement of the spectacles about the fulcrum.

It is to be observed from Fig. 2 that the base of the device comprising the tables and distance piece 9, from front to rear, has an expanse sufficient to prevent the tendency of the "over hanging" portion of the spectacles above and to the rear of the fulcrum from over balancing the fixture, when rested upon a plane surface.

In Figs. 4 and 5 I show the fixture described, as fixed upon a stand to provide for the display of spectacles having temples as shown by dotted lines, or lorgnettes, which obviously could not be mounted upon the fixture as are the glasses of the "nose" types (or straight temples) shown in Figs. 1 and 2.

The stand consists of a base 11, and a vertical post, or stem, for the support of the described fixture, which is provided with a perforation 12, (see Fig. 3) to receive the end of the post or stem. By preference, the recited post or stem is made of two pieces to provide vertical adjustment, one of the pieces being a stud 13 fixed to the base and the other piece a tube or sleeve 14, telescopically fitted to the stud and carrying a set screw 15.

A card mounting, or holder, comprising means such as the spring clamp 16 and the set screw 17, as shown, may be supported by the stand.

The form of the device illustrated and described herein is submitted in accordance with statutory requirement by way of exhibiting one form of embodiment of my invention. Various changes, alterations or modifications of the structure may be made without departure from my invention as defined in the following claims.

I claim:

1. A one-piece fixture formed of sheet metal and adapted for the display of a pair of eye glasses and the like, said fixture including a table-portion, centrally apertured to receive a supporting post and having forwardly extending portions constituting a pair of rests for the article to be displayed, and an upturned stop on the forward edge of each rest, the stops being spaced to correspond substantially with the distance between centers of the pair of glasses to be displayed; a substantially T shaped member bent upwardly and forwardly from the table portion and comprising a fulcrum for each of the lenses of the displayed article; the rests, stops and fulcra being arranged to contact only with the margins of the glasses to be displayed, and adapted thereby to provide for a substantially unobstructed field of vision through, beyond and between the parts of the displayed article.

2. A fixture for the display of eye-glasses and the like, said fixture being formed of a single piece of sheet metal, and including a table-piece comprising a pair of forwardly extending portions constituting rests for the article to be displayed, and an upturned stop having its origin at the forward edge of each rest, the stops being spaced to correspond substantially with the distance between centers of the pair of glasses to be displayed; a substantially T shaped member bent upwardly and forwardly from the read edge of the table portion, and comprising a fulcrum for each of the lenses of the displayed article; the rests, stops and fulcra being arranged to contact only with the margins of the glasses to be displayed, and adapted thereby to provide for a substantially unobstructed field of vision, through, beyond and between the parts of the displayed article.

ARTHUR P. THURSBY.